June 16, 1925.
K. F. COOPER
FUMIGATING APPARATUS
Filed Dec. 29, 1920
1,541,793
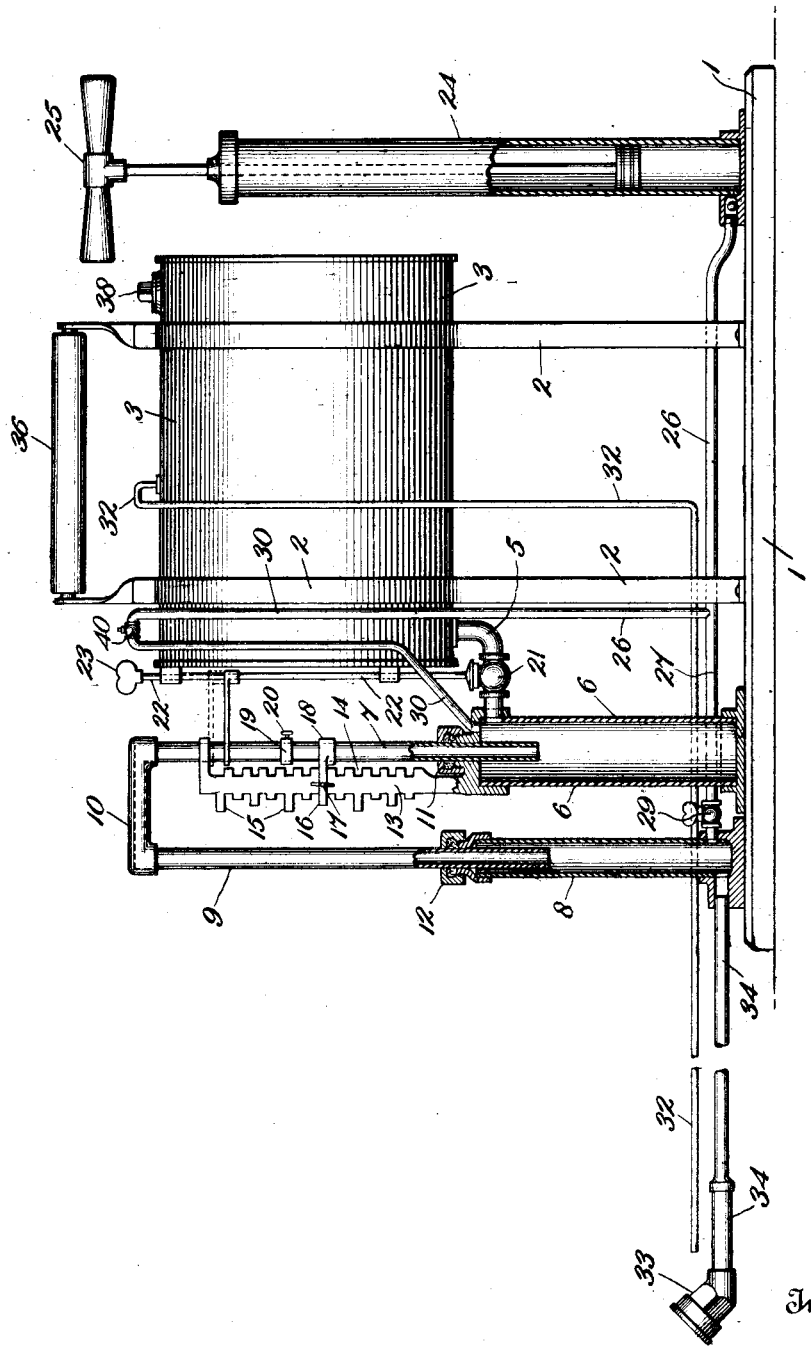
Inventor
Kenneth F. Cooper, by
Attorney Patented June 16, 1925.

1,541,793

UNITED STATES PATENT OFFICE.

KENNETH F. COOPER, OF GREAT NECK, NEW YORK, ASSIGNOR TO AMERICAN CYANAMID COMPANY, OF NEW YORK, N. Y., A CORPORATION OF MAINE.

FUMIGATING APPARATUS.

Application filed December 29, 1920. Serial No. 433,876.

*To all whom it may concern:*

Be it known that I, KENNETH F. COOPER, a citizen of the United States, residing at Great Neck, in the county of Nassau and State of New York, have invented certain new and useful Improvements in Fumigating Apparatus; and I do hereby declare the following to be a full, clear, and exact description of the invention, such as will enable others skilled in the art to which it appertains to make and use the same.

This invention relates to an apparatus for applying to enclosures, or objects, accurately measured quantities of volatile liquid fumigants and has for its object to accomplish these results in a safer, simpler and more inexpensive manner than those heretofore proposed.

With these and other objects in view, my invention consists in the novel details of construction and combinations of parts constituting the apparatus, all as will be more fully hereinafter disclosed and particularly pointed out in the claims.

In order that the invention may be more clearly understood it is said:—In the past volatile liquid fumigants, such as hydrocyanic acid, have been in use for the fumigation of buildings, vessels, various kinds of citrus trees, and in many other places for exterminating insects, scales, parasites, rodents, and other pests. In this work a variety of machines have been used to measure and apply the dosage or amount of fumigant used at each application, but most of these machines have not functioned properly after a short period of service, although three types are in common use at the present time in the application of hydrocyanic acid to citrus trees.

In the first type there is employed a measuring cylinder fitted with a piston provided with a valve, but these parts are at all times in contact with the corrosive hydrocyanic acid.

Therefore in practice the packing of the piston either swells and so binds said piston in the cylinder that its movement is practically impossible, or the parts corrode to such an extent that the liquid leaks between the piston and the cylinder wall. This leakage introduces an inaccuracy in the measurement which is very objectionable when dealing with liquid hydrocyanic acid, as will appear below.

Another objection to this first type of apparatus is found in the fact that the above mentioned valve is controlled by a small spring, on which the accuracy of the measurement is directly dependent. It follows when the spring is too stiff there is a tendency to produce a partial vacuum within the cylinder under the piston and when the spring is too weak it may not at all times completely shut off the measured portion of liquid from that in the container. In the first case a dose of hydrocyanic acid too small for the purpose intended will be measured, while in the second case, a dose too large will be measured.

In the second type of apparatus used for spraying citrus trees with hydrocyanic acid there is employed a container for the latter and a measuring cylinder or receiver, the volume of which may be varied by a sliding plunger. But in this apparatus also the cocks employed on the measuring cylinder are subjected to the direct action of the corrosive liquid, so that they are likewise liable to a serious leakage and to cause inaccurate measurements.

In the third type of apparatus at present employed to handle liquid hydrocyanic acid as a fumigant a predetermined quantity of liquid passes through check valves into a measuring cylinder. The quantity so measured is limited by the stroke of a packed plunger operating within said cylinder. Therefore, this type of apparatus presents the same disadvantages due to its packing as the first type.

It is well recognized, on the other hand, that accuracy of measurement in machines of this character is of the very highest importance. An overdose is not only wasteful of the expensive fumigant, but it will cause damage to the tree being fumigated, and in extreme cases may even become dangerous to the operator. An underdose is likewise wasteful, because it seldom accomplishes the expected valuable results of killing the pests, and therefore, permits them to later do serious damage which would not have occurred had they been exterminated by a full dose.

Further, in view of the fact that the operators are usually unskilled laborers, a successful fumigating apparatus should be capable of a continued and long use without requiring readjustments in order to deliver accurately measured quantities of the fumigant. A satisfactory apparatus should also be free from leaks and not imperil the life of the operator.

The present invention avoids the above mentioned objections, and it accomplishes the above mentioned advantageous results by employing the disposition of parts now to be disclosed.

Referring to the accompanying drawings forming a part of this specification, in which the figure is a diagrammatic partly sectional view of a fumigator made in accordance with this invention:—

1 represents any suitable base, 2 supports rising therefrom, 3 a container for the liquid hydrocyanic acid, 5 a delivery connection leading from the tank or container 3 to the measuring cylinder 6, 7 one leg of an inverted U-shaped connection between said cylinder and the tubular member 8. 9 represents the other leg of said connection, and 10 the hollow third member of said connection made in the form of a handle so that it may be readily moved up and down. 11 and 12 represent stuffing boxes through which the hollow legs 7 and 9 respectively pass, and 13 indicates a bracket provided on one edge with measuring or indicating notches 14, and on an opposite edge the measuring or indicating projections 15 are shown. An indicator 16 is slidable up and down the bracket 13, and may be secured in any desired position to which it may have been adjusted as by the means 17.

An extension 18 of the indicator 16 is disposed in close proximity to the leg 7, and an adjustable collar 19 adapted to be fixed to said leg as by the set screw 20, is adapted to strike said extension 18 and act as a stop for the downward movement of said leg 7.

The delivery 5 is provided with a valve 21 adapted to be opened and closed by the rod 22 having the handle 23, and 24 represents an air pump provided with a handle 25. 26 indicates a pipe connecting the delivery side of the pump 24 with the top of the cylinder 6, and 27 indicates a branch from said pipe 26, adapted to deliver a portion of the air into the lower end of the tube 8 when the valve 29 is open. Said pipe 26 is curved or looped as indicated at 30 and said curved portion preferably extends above said tank 3 as shown.

32 indicates a vent pipe leading from the tank 3 to or near the delivery or atomizing nozzle 33, connected by the pipe 34 to the bottom of said tube 8 as illustrated.

All of the foregoing parts are, or may be mounted on the base 1, and the supports 2 are preferably connected by a handle 36 by which the apparatus may be conveniently carried from tree to tree. The tank 3 is conveniently fitted through an orifice in its top provided with a screw plug 38. 40 represents a check valve which at times may be employed in the pipe 26.

The operation of this fumigator is as follows:—

The tank 3 is first filled by removing plug 38 and introducing the liquid fumigant in any approved manner. The plug 38 being again screwed back into place the siphon leg 7 is then raised to its topmost position and the valve 21 opened by raising the handle 23. While the valve 21 is open the liquid flows directly and by gravity into the measuring cylinder or receiver 6, while the air displaced by the incoming liquid escapes through the tubes 7, 10, 9, 8, and 34, through the atomizing nozzle 33, and also through the valve 21 into the tank 3 and out through the vent line 32. In this way the receiver 6 is filled by a constant volume of the liquid withdrawn from the tank and all of the air previously contained in the receiver is displaced.

After the handle 23 is released and valve 21 again finds its seat the slide or indicator 16 is brought in mesh with that notch 14 which corresponds to the particular volume or dose it is desired to deliver and the tubes 7 and 9 are depressed until the stop 19 comes in contact with the said slide 16. The air pump 24 is now operated by a few rapid strokes of the handle 25 and the air pressure is communicated to the top surface of the liquid contained in the receiver 6. Said pressure now forces the liquid through tubes 7, 10, 9, 8, and 34, and through the atomizing nozzle 33 into the closure or space where it is desired, until the level of said liquid gets below the lower end of leg 7, whereupon air alone will pass through said tubes. It will therefore be evident that the adjustment of the indicator 16 accurately determines the dose delivered.

In some cases it is found to be advantageous to introduce, or by-pass, a small portion of the air which would otherwise go into receiver 6 directly into tube 8. This is accomplished by slightly opening the valve 29, and in cases where this is not found to be of advantage said valve may be kept closed. The advantage of this connection 27 and valve 29 will readily be understood from the fact that fumigating is done under various conditions of temperature. When the temperature is above that of the boiling point of the liquid, a certain amount of the material will be delivered as a gas, and the remainder as an atomized liquid. I can approximately control these conditions by regulating the mixture of air and liquid passing the nozzle 33 through the adjustment of this air valve 29.

It is a distinct advantage that this apparatus in no way depends on suction for the movement of the liquid from one point to another. In those types of measuring devices wherein suction is employed for this purpose, a very serious error in measurement creeps in, due to volatilization, and further this error is not constant but varies widely under different conditions of temperature.

It will now be clear from the above that if any leakage occurs due to wear or corrosion through the valve 21 connecting the container 3 and the measuring receiver 6, such leakage can in no way effect the dose measured because when the receiver 6 is being discharged the discharge side of the valve is subjected to an air pressure not to a liquid pressure, and consequently all the leakage that can take place is the air escaping from the receiver back into the container 3, and out through the vent line 34.

Among the advantages of this invention are the following:—First, by the use of the adjustable outlet legs 7 and 9 with my receiver 6 I am able to dispense with any packings in direct contact with the corrosive fumigant and therefore I am enabled to deliver over long periods of time accurately measured doses of said fumigant.

Second, safety and accuracy are absolutely assured by the location of the valve 21 in this new apparatus. Third, by applying the atomizing pressure directly in the measuring device 6, on top of the liquid, I am able to eliminate an additional receiver previously used in this connection. Fourth, in this invention the movement of these volatile liquids is accomplished entirely by gravity and air pressure and in no case depends upon suction. Fifth, measuring in my new device is accomplished by absolute displacement of the desired portion of the liquid by air under pressure and does not depend in any way upon the tightness of any valve or packing for its accuracy. Sixth, in the use of this novel combination of a constant volume receiver with an adjustable outlet, I do away with such undesirable corroding parts as pistons and valves. Seventh, by removing a predetermined portion of the liquid from a constant volume receptacle, I do not depend upon the complete removal of its contents and hence avoid the necessity of very careful draining.

It will be obvious to those skilled in the art that the designs of the various parts and combinations of parts constituting this invention may be rearranged and substituted without departing from the spirit of the invention, as for instance valve 21 may be operated in connection with the siphon tube 7, or this valve may depend for its closing either upon the action of a spring, or upon gravity; and it is also obvious that this apparatus may be used for many purposes and for the application of a greater variety of other materials than the ones herein specifically mentioned. I therefore do not wish to be limited to the above disclosure except as may be required by the claims.

What I claim is:—

1. In an apparatus for delivering a measured quantity of a liquid fumigant, the combination of a container; a constant volume receiver; an adjustable outlet for said receiver comprising a slidable U-shaped pipe member; connections between said container and said receiver for delivering a quantity of said fumigant from said container to said receiver; a spray nozzle connected to said outlet; and a vent pipe leading from said container to the location of said spray nozzle, substantially as described.

2. In an apparatus for delivering a measured quantity of a liquid fumigant, the combination of a container; a receiver of substantially constant volume; valved connections between said container and said receiver; adjustable means comprising a U-shaped pipe for delivering a predetermined quantity of the liquid from said receiver; and a vent pipe leading from said container to the point of delivery of said fumigant, substantially as described.

3. In an apparatus for delivering a measured quantity of hydrocyanic acid, the combination of a container adapted to hold a quantity of liquid hydrocyanic acid; a receiver of substantially constant volume; a valved connection between said container and said receiver; means comprising a slidable rigid outlet pipe for delivering from said receiver a predetermined portion of the liquid contained therein, and a vent pipe leading from said container to the point of delivery of said fumigant, substantially as described.

4. In an apparatus for fumigating with hydrocyanic acid, the combination of a container adapted to hold a quantity of said acid; a receiver of substantially constant volume; a bent slidable rigid and adjustable outlet pipe for said receiver; valved connections between said container and said receiver; means for controlling the valve in said connections from the top of said container; means for forcibly ejecting a predetermined portion of the liquid contained in said receiver into the enclosure to be fumigated; and a vent leading from the top of said container to said enclosure, substantially as described.

5. In an apparatus for fumigating with hydrocyanic acid the combination of a container for said acid; a receiver of substantially constant volume; valved connections between said container and said receiver; an adjustable rigid outlet pipe from said receiver; air pressure means for ejecting a predetermined portion of liquid hydrocyanic acid out of said receiver into the enclosure to be fumigated, and a vent extending from said container to said enclosure, substantially as described.

6. In an apparatus for delivering hydrocyanic acid the combination of a container; a receiver of substantially constant volume; connections between said container and said receiver; an adjustable U-shaped outlet from said receiver; a tubular member into which said outlet leads; graduated means for adjusting the position of said outlet; pressure means for forcing a portion of the liquid corresponding to the adjustment of said outlet from said receiver; and means associated with said tubular member for atomizing said liquid, substantially as described.

7. In an apparatus for delivering a predetermined quantity of hydrocyanic acid the combination of a container adapted to hold liquid hydrocyanic acid; a receiver; valved connections between said tank and said receiver; a movable U-shaped delivery tube projecting downward into the receiver; means associated with said tube to adjust to a predetermined degree the outlet of said tube below the level of the acid in said receiver; air pressure means for ejecting from said receiver that portion of the liquid contained in said receiver that is located above the outlet of said tube; and means for atomizing the liquid thus ejected, substantially as described.

8. In an apparatus for delivering a predetermined quantity of a volatile liquid fumigant, the combination of a substantially constant volume receiver; means for filling said receiver; a sliding U-shaped delivery tube projecting downward into said receiver; a tubular member into which said tube also projects; a graduated means associated with said receiver; means associated with said graduated means for limiting the travel of said sliding tube into said receiver; and pressure means for delivering a predetermined portion of the liquid in said receiver through said delivery tube to the place being fumigated, substantially as described.

9. In an apparatus for delivering a predetermined amount of a liquid the combination of a substantially constant volume receiver; means comprising a container for filling said receiver; an adjustable U-shaped slidable outlet pipe associated with said receiver; air pressure means for ejecting through said outlet a predetermined amount of said liquid; means for atomizing the liquid so ejected; and a vent leading from said container to said atomizing means, substantially as described.

In testimony whereof I affix my signature.

KENNETH F. COOPER.